US011977312B2

(12) United States Patent
Park et al.

(10) Patent No.: US 11,977,312 B2
(45) Date of Patent: May 7, 2024

(54) OPTICAL MODULATOR AND ELECTRONIC APPARATUS INCLUDING THE SAME

(71) Applicants: SAMSUNG ELECTRONICS CO., LTD., Suwon-si (KR); The Board of Trustees of the Leland Stanford Junior University, Stanford, CA (US)

(72) Inventors: Junghyun Park, Seoul (KR); Mark L. Brongersma, Stanford, CA (US); Yifei Wang, Stanford, CA (US)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 127 days.

(21) Appl. No.: 17/394,012

(22) Filed: Aug. 4, 2021

(65) Prior Publication Data
US 2022/0050354 A1 Feb. 17, 2022

Related U.S. Application Data

(60) Provisional application No. 63/064,687, filed on Aug. 12, 2020.

(30) Foreign Application Priority Data

Mar. 2, 2021 (KR) .................. 10-2021-0027490

(51) Int. Cl.
G02F 1/29 (2006.01)
B82Y 20/00 (2011.01)
(Continued)

(52) U.S. Cl.
CPC ............. *G02F 1/292* (2013.01); *G02B 1/002* (2013.01); *G02F 1/0147* (2013.01); *B82Y 20/00* (2013.01);
(Continued)

(58) Field of Classification Search
CPC .... G02F 1/292; G02F 1/0147; G02F 2202/30; G02B 1/002
See application file for complete search history.

(56) References Cited

U.S. PATENT DOCUMENTS 10,520,758 B2   12/2019   Han et al.
2019/0018299 A1*  1/2019   Park ..................... G02F 1/0123
(Continued)

OTHER PUBLICATIONS

Yonghwi Kim et al., "Phase Modulation with Electrically Tunable Vanadium Dioxide Phase-Change Metasurfaces", Nano Letters, May 28, 2019, vol. 19, pp. 3961-3968 (8 pages total).
(Continued)

*Primary Examiner* — Jessica M Merlin
(74) *Attorney, Agent, or Firm* — Sughrue Mion, PLLC

(57) ABSTRACT

Provided is an optical modulator including a substrate, and a plurality of meta units provided on the substrate and spaced apart from each other, wherein at least one of the plurality of meta units includes a metal layer provided on the substrate, a dielectric layer provided an upper surface and side surfaces of the metal layer, and an antenna provided on an upper surface of the dielectric layer, the antenna including phase change material, wherein a refractive index of the phase change material changes based on a voltage applied to the metal layer to modulate incident light.

20 Claims, 15 Drawing Sheets

(51) Int. Cl.
*G02B 1/00* (2006.01)
*G02F 1/01* (2006.01)
*H04B 10/548* (2013.01)

(52) U.S. Cl.
CPC ........ *G02F 2202/30* (2013.01); *H04B 10/548* (2013.01)

(56) References Cited

U.S. PATENT DOCUMENTS

| | | |
|---|---|---|
| 2019/0235228 A1 | 8/2019 | Chou et al. |
| 2020/0096795 A1 | 3/2020 | Bhaskaran et al. |
| 2021/0048693 A1* | 2/2021 | Falk .................. H01Q 3/30 |
| 2022/0013905 A1 | 1/2022 | Park et al. |

OTHER PUBLICATIONS

Yoa-Wei Huang et al., "Gate-Tunable Conducting Oxide Metasurfaces", Nano Letters, Aug. 26, 2016, vol. 16, pp. 5319-5325 (7pages total).
Yifei Wang et al., "Electrical tuning of phase-change antennas and metasurfaces" Nature Nanotechnology, Jun. 2021, vol. 16, pp. 667-672 (7 pages total).

* cited by examiner

OPTICAL MODULATOR AND ELECTRONIC APPARATUS INCLUDING THE SAME

CROSS-REFERENCE TO RELATED APPLICATIONS

This application claims the benefit of U.S. Provisional Application No. 63/064,687, filed on Aug. 12, 2020, in the US Patent Office and Korean Patent Application No. 10-2021-0027490, filed on Mar. 2, 2021, in the Korean Intellectual Property Office, the disclosures of which are incorporated herein in their entireties by reference.

BACKGROUND

1. Field

Example embodiments of the present disclosure relate to an optical modulator and an electronic apparatus including the same.

2. Description of Related Art

Meta materials include artificial meta structures patterned in random sizes and shapes smaller than wavelengths of the phenomena they influence. Each meta structure included in meta materials shows certain attributes in response to an electromagnetic wave or a sound wave applied to the meta materials.

Recently, there has been attempts to utilize nanostructures using surface plasmon resonance from incident light in optical elements. Such meta materials may be used as an optical modulator. When used as an optical modulator, meta materials may compensate for the weakness of slow operation response time of several microseconds or more due to characteristics of a driving method such as liquid crystal having optical anisotropy used as an optical modulator in the related art, or a microelectromechanical system (MEMS) structure using micro-mechanical movement of light-interrupting/reflecting components.

In the related art, as an optical modulator using meta materials, transparent conducting oxides (TCOs) have been arranged on the periphery of an optical antenna to adjust resonance characteristics. That is, an active layer composed of TCOs is placed at the bottom of the optical antenna, allowing changes in a refractive index according to an external voltage, and accordingly, the resonance conditions change, which leads to phase modulation of a reflective wave. However, the change in refractive index of the TCOs occurs only at an extremely thin boundary surface of the active layer, having a thickness of 1 nm to 2 nm, and thus the modulation efficiency is low.

SUMMARY

One or more example embodiments provide optical modulators which modulate light in a non-mechanical manner and operate as light modulation elements having high performance.

One or more example embodiments also provide optical modulators which achieve a high modulation efficiency by allowing a layer where a refractive index changes to have a thickness of tens to hundreds of nanometers.

One or more example embodiments also provide optical modulators having an antenna width which allows Fabry-Perot resonance to occur in relation to an operating wavelength.

One or more example embodiments also provide optical modulators having a high phase modulation capability with not low reflectance in an infrared region. Provided are electronic apparatuses which utilize optical modulators.

Additional aspects will be set forth in part in the description which follows and, in part, will be apparent from the description, or may be learned by practice of example embodiments.

According to an aspect of an example embodiment, there is provided an optical modulator including a substrate, and a plurality of meta units provided on the substrate and spaced apart from each other, wherein at least one of the plurality of meta units includes a metal layer provided on the substrate, a dielectric layer provided an upper surface and side surfaces of the metal layer, and an antenna provided on an upper surface of the dielectric layer, the antenna including phase change material, wherein a refractive index of the phase change material changes based on a voltage applied to the metal layer to modulate incident light.

The plurality of meta units may include a first meta unit and a second meta unit provided adjacent to each other, wherein a metal layer and an antenna included in the first meta unit are provided spaced apart from a metal layer and an antenna included in the second meta unit, respectively, and wherein a dielectric layer included in the first meta unit and a dielectric layer included in the second meta unit are connected to each other.

A difference between a real part of a refractive index of the phase change material in a crystalline state and a real part of a refractive index of the phase change material in an amorphous state may be greater than or equal to 1.

An imaginary part of a refractive index of the phase change material in an infrared wavelength region may be less than or equal to 3.

The phase change material may include at least one of germanium (Ge), antimony (Sb), and tellurium (Te).

The phase change material may include at least one of $Ge_2Sb_2Te_5$ and $Ge_3Sb_2Te_6$.

The incident light on the meta units may form surface plasmon resonance (SPR) between the antenna and the metal layer.

The antenna may have a width corresponding to Fabry-Perot resonance of incident light.

A width of the antenna may be less than a wavelength of the incident light.

A temperature of the metal layer may change based on a voltage applied to the metal layer, and a temperature of the antenna may change based on the temperature change of the metal layer.

The antenna may have the thickness such that a difference between a maximum temperature and a minimum temperature in an entire area of the antenna is less than 100° C.

A thickness of the antenna may range from 10 nm to 200 nm.

The antenna may have the thickness such that a difference between an average temperature of an area of the antenna and an average temperature of an area of the metal layer is less than 100° C.

The dielectric layer may have a thickness such that a difference between a maximum temperature and a minimum temperature in an entire area of the antenna is less than 100° C.

A thickness of the dielectric layer may range from 3 nm to 80 nm.

The voltage may be applied to each of the plurality of meta units such that light reflected from the optical modulator forms a wavefront and is steered to a specific point.

A steering direction of light reflected from the optical modulator may change based on modulation periods of the plurality of meta units.

The plurality of meta units may be provided one-dimensionally or two-dimensionally.

An electronic apparatus may include the optical modulator.

The electronic apparatus may include at least one of a light detection and ranging (LiDAR) device, a three-dimensional image acquisition device, a holographic display device, a structured light generation device, a portable terminal, and augmented reality or virtual reality glasses.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1A:
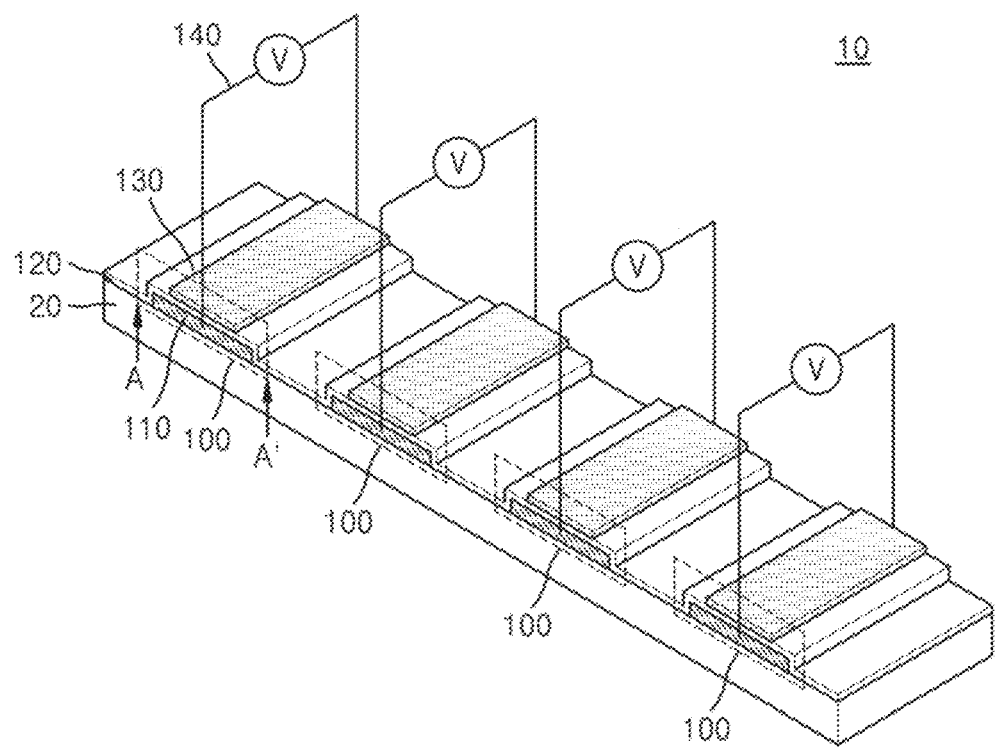
FIG. 1A is a perspective view showing an optical modulator, on which a plurality of meta units are arranged side by side in a line, located on a substrate according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Example embodiments will now be described more fully with reference to the accompanying drawings. Example embodiments are simply provided as an example, and thus, may be embodied in many different forms. Like reference numerals in the drawings denote like elements, and sizes of components in the drawings may be exaggerated for convenience of explanation.

It will be understood that when a component is referred to as being "on" another component or on "upper part" of another component, the component can be directly on the other component or over the other component in a non-contact manner.

As used herein, the singular forms "a," "an" and "the" are intended to include the plural forms as well, unless the context clearly indicates otherwise. Throughout the specification, when a portion "includes" an element, another element may be further included, rather than excluding the existence of the other element, unless otherwise described.

Moreover, the terms "part," "module," etc. refer to a unit processing at least one function or operation, and may be implemented by a hardware, a software, or a combination thereof.

The use of the terms "a" and "an" and "the" and similar referents in the context of describing embodiments (especially in the context of the following claims) are to be construed to cover both the singular and the plural.

The use of any and all exemplary language (e.g., "such as") provided herein, is intended merely to better illuminate technical ideas and does not pose a limitation on the scope of embodiments unless otherwise claimed.

Figure 1B:
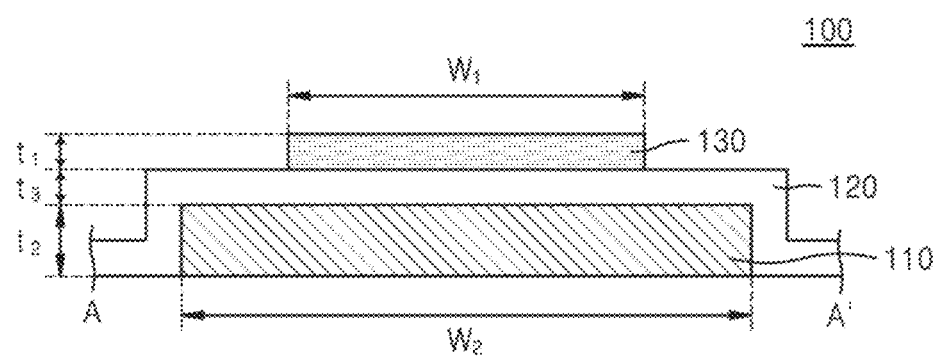
FIG. 1B is a cross-sectional diagram illustrating a meta unit of an optical modulator according to an example embodiment.
Figure 2:
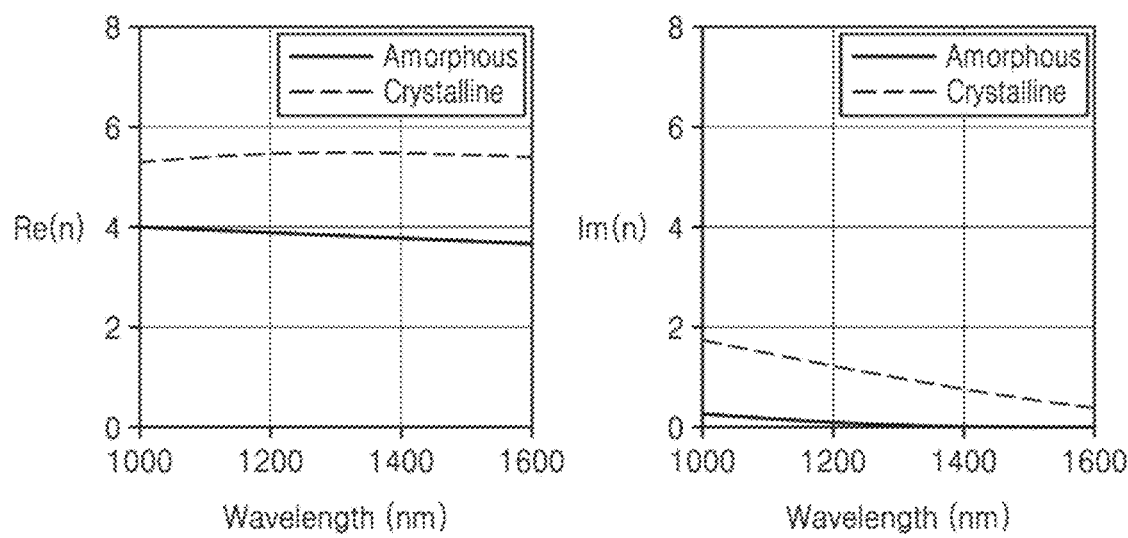
FIG. 2 shows graphs showing a refractive index according to a phase change characteristic of GeSbTe (GST) according to an example embodiment.

FIG. 1A is a perspective view showing an optical modulator 10 according to an example embodiment, and FIG. 1B is a cross-sectional diagram illustrating a meta unit 100 of the optical modulator 10 (i.e., the AA' section of FIG. 1A). FIG. 2 is a graph showing a refractive index according to a phase of GeSbTe (GST).

With reference to FIGS. 1A and 1B, the optical modulator 10 according to an example embodiment may modulate a reflection phase or a transmission phase of light when reflecting or transmitting incident light, and include a substrate 20 and a plurality of meta units 100 arranged side by side in a line on the substrate 20. At least one of the plurality of meta units 100 may include a metal layer 110 arranged on the substrate, a dielectric layer 120 covering an upper surface and side surfaces of the metal layer 110, and an antenna 130 arranged on an upper surface of the dielectric layer 120 and including phase change materials. A refractive index of the phase change materials included in the antenna 130 may change according to a voltage applied to the metal layer 110, thereby modulating incident light. At this time, an electrode connected to each metal layer 110 may apply a voltage 140 to the metal layer 110. The optical modulator 10 is configured to modulate a phase of incident light, and may be applied to a beam scan device, which is not engaged in mechanical movements, by having different phase distributions for each meta unit 100.

The plurality of meta units 100 may include adjoining first meta unit and second meta unit, Each of a metal layer and an antenna of the first meta unit is arranged spaced apart from a metal layer and an antenna of the second meta unit, respectively, and a dielectric layer of the first meta unit and a dielectric layer of the second meta unit are connected to each other.

The plurality of meta units 100 may be placed at certain intervals. FIG. 1A illustrates exemplary meta units 100, and such meta units 100 may be arranged in regularly. The metal layer 110 included in the meta unit 100 is not in contact with the antenna 130 included in the meta unit 100 by the dielectric layer 120 covering an upper surface and side surfaces of the metal layer 110, and is electrically separated. A distance between the plurality of meta units 100 may change.

The antenna 130 may include phase change materials whose phase may change according to temperature, pressure, etc. When the temperature of the phase change materials increases or decreases, the phase of the phase change materials may change. The phase change materials may have an amorphous state, a crystalline state, and an intermediate state therebetween. Each phase of the phase change materials may have a different refractive index. When the phase change materials go through a phase change from an amorphous state to a crystalline state or from a crystalline state to an amorphous state, an intermediate state may have a refractive index ranging between a refractive index in the amorphous state and a refractive index in the crystalline state. Incident light on the meta unit 100 including the phase change materials and the metal layer 110 may be strongly focused between the phase change materials and the metal layer 110 causing plasmonic resonance. Resonance conditions may be changed according to a refractive index of phase change materials.

For example, when a temperature increases or decreases according to a voltage applied to the metal layer 110, a phase change may occur in phase change materials, which leads to a change in a refractive index n caused by the phase change. In addition, the phase change materials may be materials having weak light absorption characteristics in an infrared light region, a visible light region, and/or an ultraviolet light region. The phase change materials may be materials having weak light absorption characteristics in an infrared light region. For example, an imaginary part of a refractive index Im(n) of the phase change materials in an operating infrared wavelength region may be less than or equal to 3. Meanwhile, the phase change materials may include germanium (Ge), antimony (Sb) and tellurium (Te). For example, the phase change materials may include at least one of $Ge_2Sb_2Te_5$ and $Ge_3Sb_2Te_6$.

To implement a high quality optical modulator 10, the optical modulator 10 may satisfy the following two conditions. First, the intensity of modulated light may remain constant regardless of a modulated phase. When the intensity fails to remain constant, despite light steering, an intensity of light may vary, generating a mottled pattern. Second, a range of a phase shift value of light through modulation may be close to 360°. When a range of a phaseshift is limited, a light steering direction may be limited as well.

The following two characteristics of the optical modulator 10 are considered for a range of a phase shift of light to reach 360° through modulation. First, a change value of a real part of a refractive index Re(n) of materials of the optical modulator 10 may be sufficiently large. In such case, a phase shift of light modulated by the optical modulator 10 may vary according to a wavelength of the light. At this time, when a refractive index of materials of the optical modulator 10 is changed, a phase shift profile according to a wavelength of light of the optical modulator 10 may move parallel to a wavelength axis. A possible range of a phase shift of light modulation may be determined by a phase shift before a refractive index change of the materials and a phase shift after a refractive index change of the materials in an operating wavelength. When a change value of a real part of a refractive index of the materials is small, the aforementioned parallel movement of the profile may be small, which leads to a small possible range of a phase shift of the light. When a change value of a real part of a refractive index of the materials is sufficiently large, the aforementioned parallel movement of the profile may be large, which leads to a relatively large possible range of a phase shift of the light that is up to 360°, at the greatest.

Secondly, the materials of the optical modulator 10 may have a low light absorption rate, and the optical modulator 10 may be structured to absorb less light. A resonator may have two channels for the reflection characteristics which include the direct reflection, and a reflection through a resonator. When the amplitude of reflection through a resonator is larger than that of the direct reflection, a resonator is referred to be in the over-coupling regime, and in this case, a phase shift profile may gradually increase up to 360°. When the amplitude of direct reflection is larger than that of reflection through a resonator, a resonator is referred to be in the under-coupling regime and in such case a phase shift profile may not reach 360°, and fluctuate similar to waves. In the under-coupling regime, the maximum phase shift may be about 180°. The materials of the optical modulator 10 may have a low light absorption rate for resonator being in the over-coupling regime. That is, an imaginary part of refractive index of the materials may be small. In the case of large imaginary part of a refractive index, light absorption occurs prior to resonance of the light, causing a weaker reflection through a resonator, which is likely to lead resonator to be in the under-coupling regime.

Accordingly, when a light absorption rate or an imaginary part of a refractive index of materials of the optical modulator 10 has a small value, a percentage of absorbed light decreases, thereby increasing a modulation efficiency, which leads resonator to be in the over-coupling regime. Then, a maximum threshold value of possible range of phase shift of light may increase. Also, when a difference in a real part of a refractive index of the materials of the optical modulator 10 before and after phase of the materials changes is large, a maximum value of possible range of a phase shift of the light may increase. With followed characteristics, a quality optical modulator 10 may be improved.

The antenna 130 may include germanium (Ge), antimony (Sb), tellurium (Te) and alloys thereof. For example, the antenna 130 may include at least one of GSTs including $Ge_2Sb_2Te_5$ or $Ge_3Sb_2Te_6$, which are phase change materials (PCM). GST may have a crystallization temperature of 100° C. to 150° C., and a melting point is about 600° C. When GST is heated at a crystallization temperature for relatively long time, the GST may become in a crystalline state, which is referred to as a SET. When GST is heated to reach a melting point, and then quickly cooled, the GST may become and remain in an amorphous state. This is referred to as a RESET. According to FIG. 2, in an amorphous state, a real part of a refractive index in an infrared light region may be between about 3.9 to 4.0, and about 5 in a crystalline state. Further, in an amorphous state, an imaginary part of a refractive index may be about 0.1, and between about 0.5 to 2.0 in a crystalline state. As an imaginary part of a refractive index of GST is small, light absorption may be small, which improves adjustment of phase shift in the over-coupling regime. For example, according to the above, a maximum range of a phase shift may exceed 180°. In addition, a real part of a refractive index of GST may vary significantly over 1 according to a phase, and accordingly, a maximum range of a phase shift of light may reach about 270°, allowing a high modulation efficiency, which leads to a relatively high reflectance. At this time, a value of between the range of the phase shift of 0° to 270° may be represented by an intermediate phase.

A meta unit 100 may include a single or a plurality of antenna(s) 130. FIGS. 1A and 1B illustrate that a single antenna 130 is arranged in one meta unit 100; however, embodiments are not limited thereto. The plurality of antennas 130 of one meta unit 100 may have the same width and thickness. However, embodiments are not limited thereto.

The antenna 130 may be a rectangular structure. For example, as illustrated in FIGS. 1A and 1B, the antenna may be arranged in a rectangular shape. However, embodiments are not limited thereto, and may be a structure in various shapes. For example, a shape of its cross section may vary from a rectangle, a triangle, a polygon, a cross, a circle to an oval, etc. The size or shape of the antenna 130 may vary according to an incident wavelength.

A width $w_1$ of the antenna 130 may be less than a wavelength of incident light. A thickness $t_1$ of the antenna 130 may be less than a wavelength of incident light. A thickness $t_1$ of the antenna 130 may be a few nanometers to hundreds of nanometers. At this time, a thickness of the antenna 130 may be formed to be greater than tens of nanometers to increase a volume under which a refractive index is changed. As the volume allowing a refractive index change increases, a modulation efficiency of the optical modulator 10 may be enhanced.

The metal layer 110 may be arranged under the antenna 130 placing the dielectric layer 120 therebetween and serve as a plasmonic substrate. Further, the metal layer 110 may be connected with electrodes and thus, when a voltage is applied to the metal layer 110, it may be serve as a heater. For example, when a voltage is applied to the metal layer 110, temperatures of the metal layer 110 and the adjacent antenna 130 may increase to a predetermined temperature, and when a voltage is no longer applied, the temperatures of the metal layer 110 and the adjacent antenna 130 may decrease to an original temperature. At this time, the temperature of the antenna 130 may increase and decrease uniformly without a difference between a high and low temperature region. For this, the thickness $t_1$ of the antenna 130 and the thickness $t_3$ of the dielectric layer 120 may be formed accordingly. A detailed description thereon will be provided later with reference to FIG. 4B. In addition, a plurality of voltages may be independently connected to each meta unit 100 and accordingly, different voltages may be applied to each meta unit 100. Thus, each meta unit 100 may experience a temperature increase or decrease independently. The metal layer 110 may be formed of, for example, gold (Au), aluminum (Al), silver (Ag), copper (Cu), tungsten (W), etc. At this time, the metal layer 110 may be formed of a metal of low light absorption, for example, Au, which has a low light absorption characteristic.

The metal layer 110 may have a width greater than the width $w_1$ of the antenna 130. The width $w_2$ of the metal layer 110 may be less than a wavelength of incident light. The thickness $t_2$ of the metal layer 110 may be less than a wavelength of incident light.

The dielectric layer 120 may serve as an optical spacer between the antenna 130 and the metal layer 110. In addition, the dielectric layer 120 may electrically separate the antenna 130 and the metal layer 110. The dielectric layer 120 may be formed of metallic oxides, for example, various oxides and nitrides, including aluminum oxide ($Al_2O_3$), silicon oxide ($SiO_2$), hafnium oxide ($HfO_2$), silicon nitride ($Si_3N_4$), etc. At this time, the dielectric layer 120 may be formed of oxides and nitrides, which may be easily adhered between the antenna 130 and the metal layer 110, for example, $Al_2O_3$ which has an advantage in adhesion. The thickness $t_3$ of the dielectric layer 120 may be smaller than a wavelength of incident light.

The dielectric layer 120 may cover an upper surface as well as a side surfaces of the metal layer 110, and by extending toward one direction on the substrate, the dielectric layer 120 of each different meta unit 100 may be connected to each other. The dielectric layer 120 in contact with the upper surface of the substrate between meta units 100 may have the same thickness $t_3$ as the dielectric layer 120 of the meta unit 100, or may have a thickness $t_2+t_3$, to provide an even distance between the upper surface of the dielectric layer 120 and the substrate. However, embodiments are not limited thereto, and the dielectric layer 120 may not be extended to the parts of the substrate with no meta unit 100.

A plurality of voltages may be independently connected to each metal layer 110. For example, each metal layer 110 may receive an independent voltage, and each meta unit 100 may have an independent temperature. As a result, each meta unit 100 may independently modulate a phase of incident light. Further, by inputting different modulation periods to the plurality of meta units 100, light may be steered in various directions. For example, a voltage may be applied to four meta units 100 from the plurality of meta units 100 as one period. For example, a voltage may be applied to the four meta units 100 in order for a phase shift of each meta unit to be 0°, 90°, 180°, and 270°. Further, a voltage may be applied to eight meta units 100 as one period. For example, a voltage may be applied to the eight meta units 100 in order for a phase shift of each meta unit to be 0°, 45°, 90°, 135°, 180°, 225°, 270°, and 315°. As such, when a modulation period of the meta units 100 changes, a degree at which light is steered may also change, which may provide various light steering directions.

Accordingly, in the optical modulator 10 including the substrate and the plurality of meta units 100 arranged side by side in a line adjacent to each other, different voltages may be applied to each meta unit 100 so that light reflected from the optical modulator 10 may form a predetermined wavefront and be steered to a certain point. In addition, a steering direction of light reflected from the optical modulator 10 may vary according to modulation periods of the plurality of meta units 100.

Figure 3:
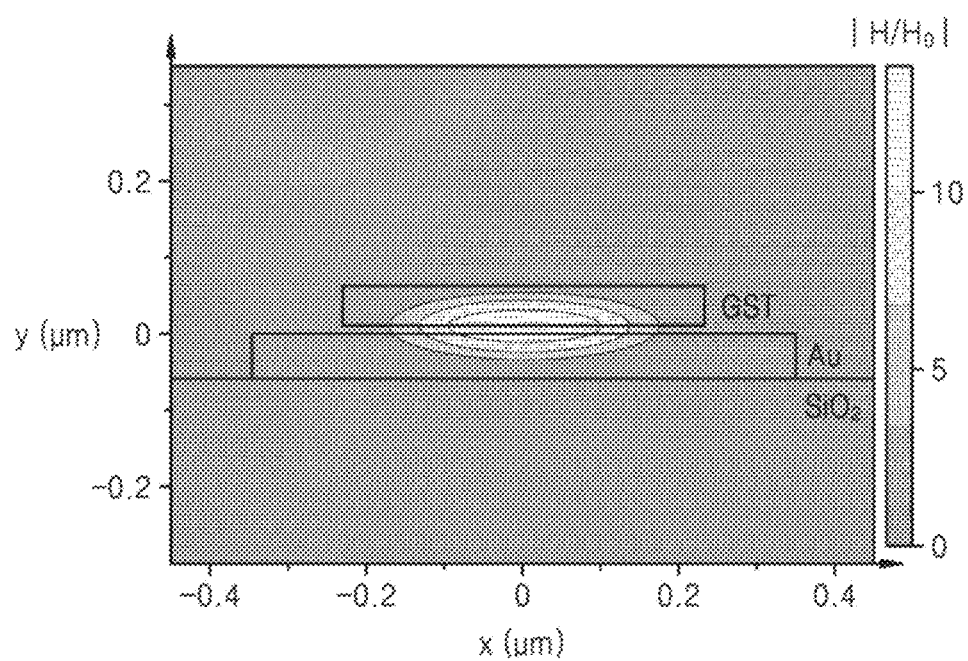
FIG. 3 is a graph showing a magnetic field intensity distribution when light is incident on an optical modulator and resonates in a meta unit according to an example embodiment.
Figure 4A:
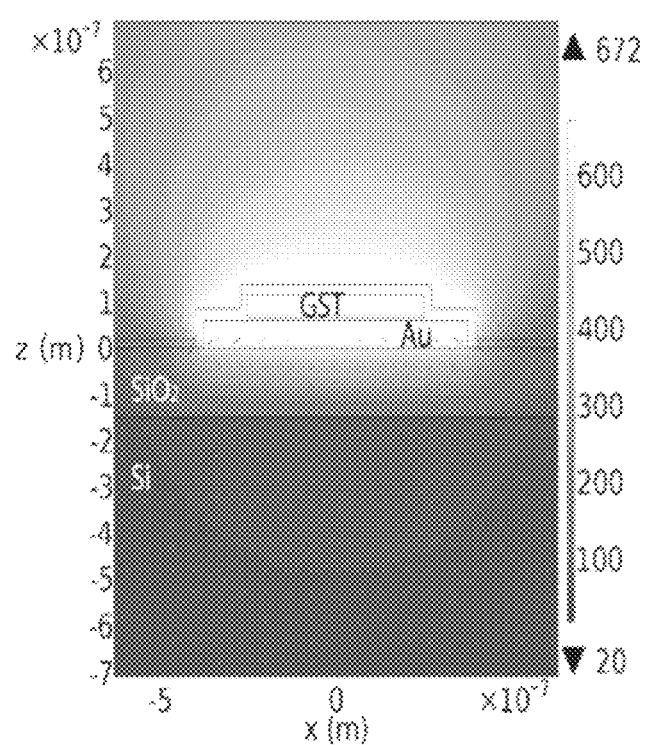
FIG. 4A is a graph showing temperature distribution of a meta unit and its periphery when a voltage is applied to the meta unit according to an example embodiment.
Figure 4B:
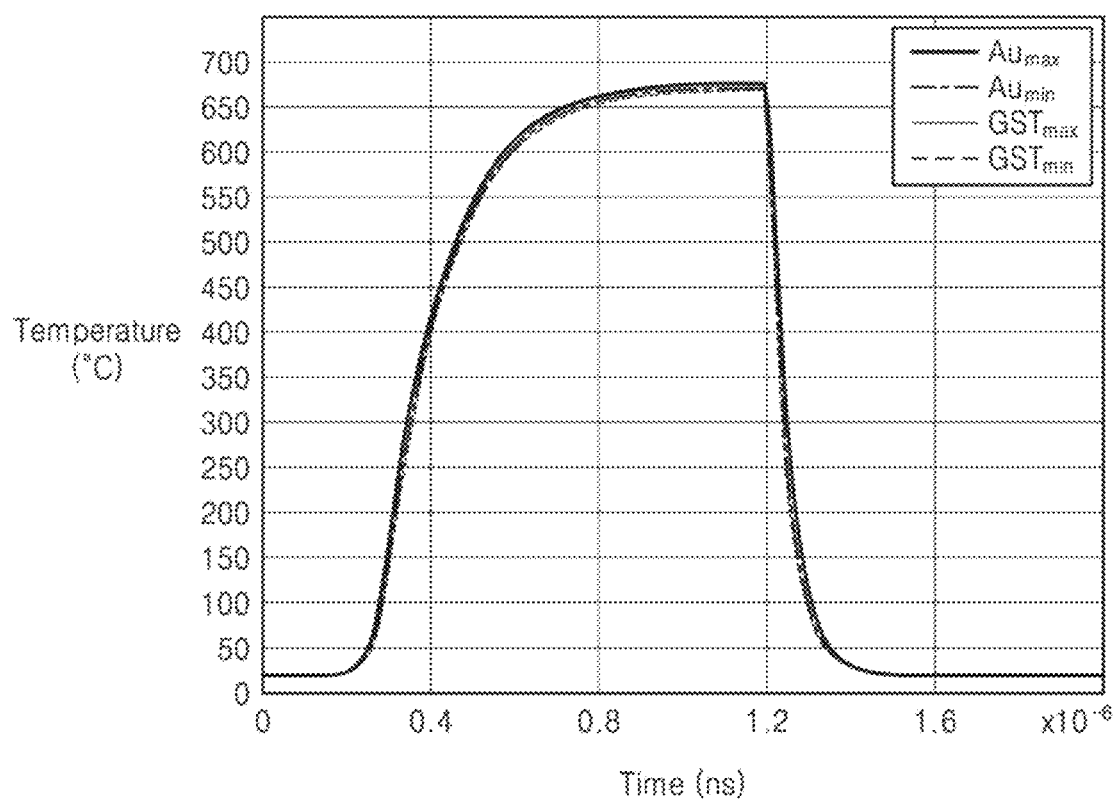
FIG. 4B is a graph showing changes in current flow and temperature of a meta unit before and after a voltage is applied to the meta unit according to an example embodiment.

FIG. 3 is a graph showing a magnetic field intensity distribution when light is incident on the optical modulator 10 and resonates in the meta unit 100, and FIG. 4A is a graph showing temperature distribution of a cross section of one meta unit 100 when a voltage is applied thereto. FIG. 4B is a graph showing changes in current flows in the metal layer 110 and changes in a maximum temperature and a minimum temperature of the antenna 130 and the metal layer 110 before and after a voltage is applied to the meta unit 100. When the metal layer 110 is symmetric in z direction, and the effect on edges is negligible, the meta units 100 may have a corresponding temperature distribution, independently from z direction of the meta units 100.

In the example embodiment illustrated in FIG. 3, the antenna 130 is formed of GST, and the metal layer 110 is formed of Au, and the dielectric layer 120 is formed of $Al_2O_3$. Further, the width $w_1$ of the antenna 130 is set as 500 nm, the width $w_2$ of the metal layer 110 as 750 nm, the thickness $t_1$ of the antenna 130 as 50 nm, the thickness $t_2$ of the metal layer 110 as 60 nm, and the thickness $t_3$ of the dielectric layer 120 as 6 nm. Further, an absolute value of magnetic field amplitude is normalized as a magnetic field amplitude Ho of incident light. Incident light is a transverse magnetic (TM) polarization mode having a magnetic field in z direction, and incidents vertically in −y direction. The meta unit 100 is arranged on a $SiO_2$ layer having a thickness of 300 nm placed on a silicon substrate at an interval of 900 nm.

According to FIG. 3, incident light in the meta unit 100 may be focused between GST and Au and cause surface plasmon resonance. Through the aforementioned surface plasmon resonance, a phase of the light may be modulated, and in the optical modulator 10 in which the plurality of meta units 100 are arranged, different voltages may be applied to each of the plurality of meta units 100 so that the light may form a desired wavefront and be steered to a certain point.

Meanwhile, an operating wavelength of light resonance may vary according to the width $w_1$ of the antenna 130. This is because surface plasmon resonance and Fabry-Perot resonance may occur between the surfaces of the antenna 130 and the metal layer 110. By the surface plasmon resonance, the light may extend in a surface direction as an electromagnetic surface wave in the form of surface plasmon polaritons, and be reflected on both sides of the antenna. Such reflection of electronic surface wave may cause Fabry-Perot resonance. The occurrence of Fabry-Perot resonance may be determined according to a wavelength of incident light and a width of the antenna 130. Further, an operating wavelength to modulate a reflection phase of light to about 270° may be determined by a width of the antenna 130. Accordingly, the antenna 130 may have a width in accordance with conditions of Fabry-Perot resonance in relation to a wavelength of incident light.

Such conditions of Fabry-Perot resonance may be determined by the following [Equation 1].

$$\frac{4\pi}{\lambda}n_{eff}w_{GST} + 2\varphi_{ref} = 2\pi \qquad \text{[Equation 1]}$$

When the aforementioned Equation 1 is satisfied, Fabry-Perot resonance may occur. At this time, $\lambda$ represents an operating wavelength, $n_{eff}$ represents a valid refractive index of GST, $w_{GST}$ represents a width of GST, and $\varphi_{ref}$ represents a phase shift of light when the light is reflected from a side surfaces of GST. For a desired operating wavelength $\lambda$, an antenna 130 satisfying $w_{GST}$ may be determined.

Similarly, in FIGS. 4A and 4B, the antenna 130 is formed of GST, the metal layer 110 is formed of Au, and the dielectric layer 120 is formed of $Al_2O_3$. Here, $w_{GST}$ is set as 500 nm, $w_{Au}$ as 750 nm, $t_{GST}$ as 50 nm, $t_{AU}$ as 60 nm, and $t_{Al_2O_3}$ as 6 nm. Further, the optical modulator 10 is arranged on a $SiO_2$ layer. According to FIGS. 4A and 4B, when a voltage is applied to the metal layer 110, a maximum temperature and a minimum temperature of Au may increase or decrease in almost equally. In addition, a maximum temperature and a minimum temperature of GST may increase or decrease almost equally. Also, temperatures of GST and Au may increase or decrease almost equally. Such uniform temperature change may become an advantage at the time of phase change of GST to a crystalline state or to an amorphous state, and may allow uniform phase modulation in the entire area of a meta unit 100.

According to another example embodiment, when a voltage is applied to the metal layer 110 in one meta unit 100, a maximum temperature and a minimum temperature of GST may increase or decrease with a difference less than 100° C. At this time, when the difference between the maximum temperature and minimum temperature of GST according to time change is less than 100° C., the efficiency achieved therefrom may be close to that under uniform phase modulation.

According to FIG. 4B, a voltage is applied when t is 200 ns, and it remains constant for 1000 ns until the voltage is cut off when t is 1200 ns. The voltage is applied so that a current of 15 mA flows in the metal layer 110. When a voltage is applied consistently, temperature of GST may increase to 650° C. which is a melting point, and after the voltage application and heat generation are terminated, the temperature may decrease to less than or equal to 160° C. in 100 ns. Accordingly, GST in a crystalline state may go through a phase change (RESET) to be in an amorphous state. When GST is heated at a temperature ranging from 100° C. and 150° C. for relatively long time, GST in an amorphous state may go through a phase change (SET) to be in a crystalline state. According to FIG. 4B, as the aforementioned temperature change occurs uniformly in the entire area of GST, the foregoing phase changes (SET and RESET) may also occur uniformly in the entire volume of GST. Accordingly, uniform phase modulation may occur in the entire area of one meta unit 100. In addition, as a temperature of Au, which serves as a heater, may not increase excessively at the time of phase change of GST, energy-efficient modulation may also be achievable. For example, a crystallization from an amorphous state to a crystalline state according to a temperature decrease, and an amorphization from a crystalline state to an amorphous state according to a temperature increase may take place in a stable manner, and such crystallization and amorphization may occur repeatedly.

According to an example embodiment, when a voltage is applied to the metal layer 110 in one meta unit 100, the antenna 130 may have a thickness which allows a uniform temperature change, e.g., a temperature increase or decrease, throughout the entire area of the antenna 130. For example, when a thickness of the antenna 130 is too large, a difference between a minimum temperature and a maximum temperature of the antenna 130 area may be generated in the event of temperature change. Accordingly, the antenna 130 may have a thickness which allows a uniform temperature change in the entire area of the antenna 130. When determining a thickness of the antenna 130, thermal conductivities of the metal layer 110, the dielectric layer 120, and the antenna 130 may be considered. Further, when a thickness of the antenna 130 is too small, a region where a refractive index may vary may be reduced, affecting a modulation efficiency. Therefore, the antenna 130 may have a thermally and optically co-optimal thickness in consideration of the aforementioned temperature conditions and modulation efficiency. For example, the thickness of the antenna 130 may be 10 nm to 100 nm.

According to another example embodiment, when a voltage is applied to the metal layer 110 in one meta unit 100, a difference between a maximum temperature and a minimum temperature of the antenna 130 area may remain less than 100° C. In this case, the antenna 130 may have a thickness which allows temperature to change with temperature difference less than 100° C. in the entire area of the antenna 130. In this example, the efficiency may be close to an efficiency achieved when temperature changes in the antenna 130 occur uniformly in its entire area. Therefore, the antenna 130 may have a thermally and optically co-optimal thickness in consideration of the aforementioned temperature conditions and modulation efficiency. For example, the thickness of the antenna 130 may be 10 nm to 200 nm.

According to another example embodiment, when a voltage is applied to the metal layer 110 in one meta unit 100, a difference between an average temperature of the antenna 130 area and an average temperature of the metal layer 110 area may remain less than 100° C. In this case, the antenna 130 may have a thickness which allows temperature to change with temperature difference less than 100° C. between the average temperature of the antenna 130 area and the average temperature of the metal layer 110 area.

According to an example embodiment, when a voltage is applied to the metal layer 110 in one meta unit 100, the dielectric layer 120 may have a thickness which allows a uniform temperature change, e.g., a temperature increase or decrease, throughout the entire area of the antenna 130. For example, when a thickness of the dielectric layer 120 is too thick, a thermal conductivity according to a thermal conduction equation may decrease, which may lead to a difference between a minimum temperature and a maximum temperature of the antenna 130 area in the event of temperature change. Accordingly, the dielectric layer 120 may have a thickness which allows a uniform temperature change in the entire area of the antenna 130. When determining a thickness of the dielectric layer 120, thermal conductivities of the metal layer 110, the dielectric layer 120, and the antenna 130 may be considered. For example, the thickness of the dielectric layer 120 may be 3 nm to 60 nm.

According to another example embodiment, when a voltage is applied to the metal layer 110 in one meta unit 100, a difference between a maximum temperature and a minimum temperature of the antenna 130 area may remain less than 100° C. In this case, the dielectric layer 120 may have a thickness which allows temperature to change with temperature difference less than 100° C. in the entire area of the antenna 130. In such case, the efficiency may be close to an efficiency achieved under a uniform temperature change in the antenna 130. For example, the thickness of the dielectric layer 120 may be 3 nm to 80 nm.

According to another example embodiment, when a voltage is applied to the metal layer 110 in one meta unit 100, a difference between an average temperature of the antenna 130 area and an average temperature of the metal layer 110 area may remain less than 100° C. In this case, the dielectric layer 120 may have a thickness which allows temperature to change with temperature difference less than 100° C. between the average temperature of the antenna 130 area and the average temperature of the metal layer 110 area.

According to an example embodiment, the arrangement interval between the meta units 100 may be determined not to thermally affect adjacent meta units 100. For example, when the interval between the meta units 100 is too narrow, temperatures of each meta unit 100 may not be maintained independently due to a thermal crosstalk caused by a heat generated from each meta unit 100. Accordingly, the interval between the meta units 100 may be determined not to cause a thermal crosstalk in the meta units 100.

Figure 5:
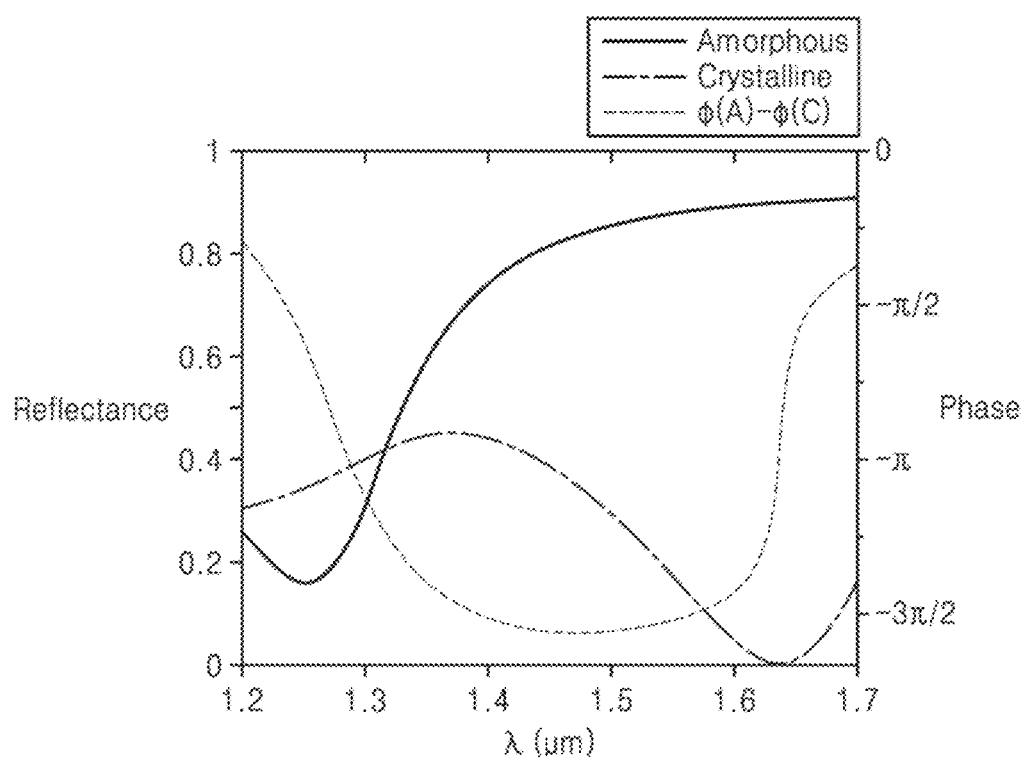
FIG. 5 is a graph showing changes in reflectance and reflection phase spectrum according to a phase change of GST according to an example embodiment.

FIG. 5 is a graph showing a reflectance and a change of reflection phase shift spectrum according a phase change of GST when an antenna 130 includes GST in whole. The solid line in the graph of FIG. 5 represents reflectance of GST in an amorphous state, and the dotted line represents reflectance of GST in a crystalline state. In an infrared light region (e.g. where λ is 1.4 µm), a reflectance in an amorphous state may be about 70%, and a reflectance in a crystalline state may be about 40%, which are considered fairly high. This shows that a high efficiency operation is achievable at the time of beam steering through an optical modulator 10 according to an example embodiment.

The broken line in the graph of FIG. 5 represents a change of reflection phase shift spectrum of light. For example, the line represents values obtained by subtracting reflection phase shift spectrum in a crystalline state from reflection phase shift spectrum in an amorphous state, and in a region where a wavelength is 1.4 µm to 1.55 µm, a range of phase shift may be possible up to 3π/2 (rad), i.e., about 270°. Such substantial phase shift may occur in a range of tens of or hundreds of nanometers, which is a full thickness of the antenna 130. For example, as a refractive index of phase change materials varies in the entire area of the antenna 130, a higher efficiency may be achieved compared to that from a layer in the related art having a thickness of several nanometers where a refractive index change occurs. For example, when $t_{GST}$ is 50 nm as in FIG. 4A, a refractive index varies in the entire area of GST, which leads to a higher modulation efficiency compared to an efficiency obtained from using a conventional conducting oxide having a thickness of 1 nm to 2 nm.

Figure 6:
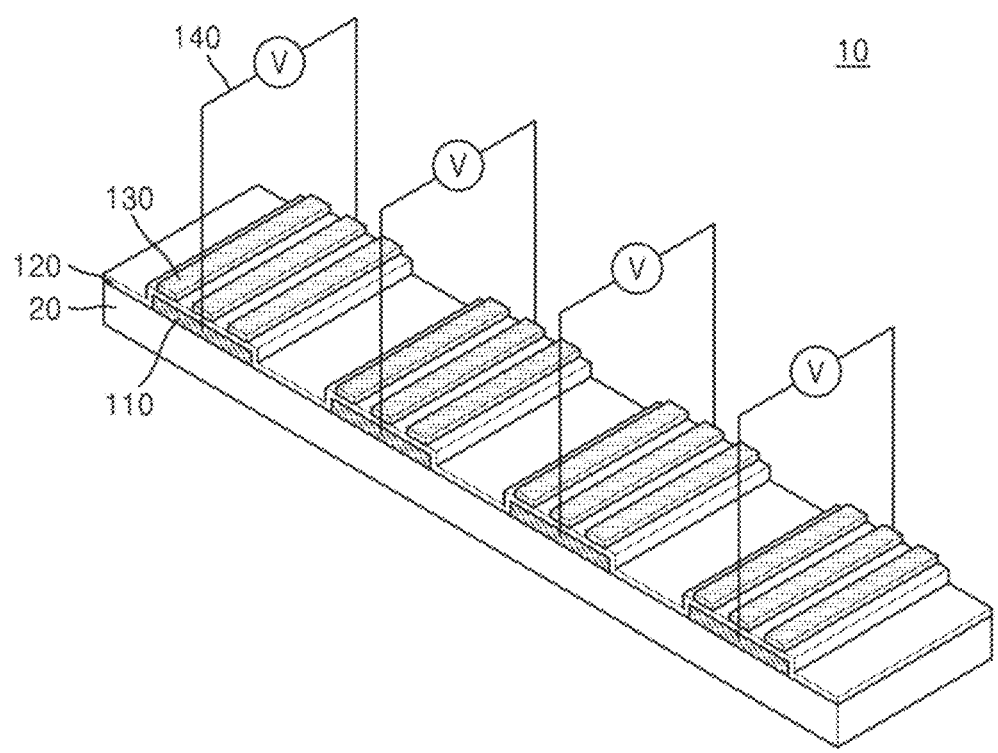
FIG. 6 is a perspective view of an optical modulator including a plurality of antennas for each meta unit according to an example embodiment.

FIG. 6 is a perspective view of an optical modulator 10 including a plurality of antennas 130 for each meta unit 100. Compared to FIG. 1, the plurality of antennas 130 may be arranged on one meta unit 100. A width of the plurality of antennas 130 may be determined by an operating wavelength. A temperature of the plurality of antennas 130 arranged on one meta unit 100 may be adjusted by the same metal layer 110. The plurality of antennas 130 of one meta unit 100 may have the same width and thickness. As described above, by placing a plurality of antennas 130, a beam may be steered in various directions. In this case, by changing a modulation period of the plurality of meta units, the beam may be steered in a corresponding direction.

Figure 7:
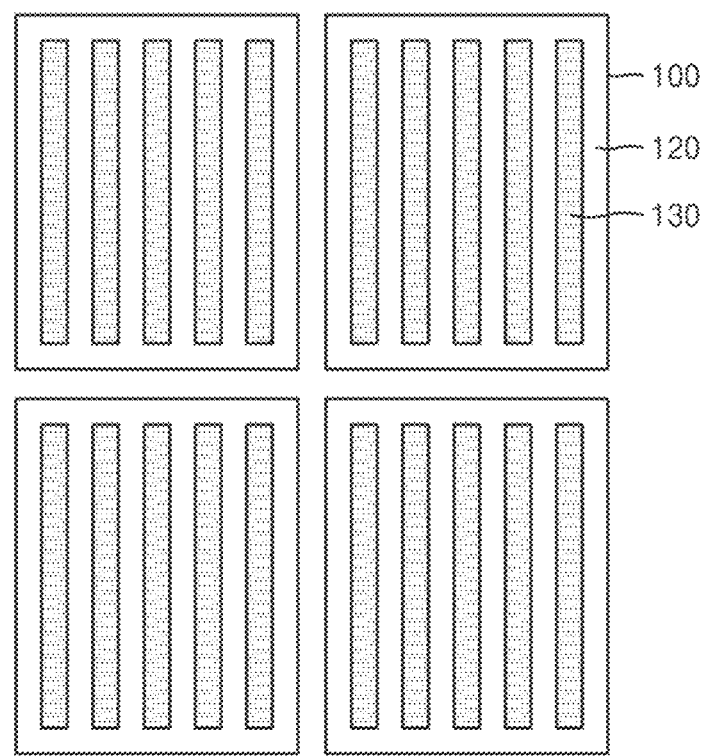
FIG. 7 is a top view illustrating an arrangement of a 2D optical modulator according to an example embodiment.

According to an example embodiment, the meta unit 100 may be arranged one-dimensionally, and according to another example embodiment, the meta unit 100 may be arranged two-dimensionally. FIG. 7 is a cross-sectional view illustrating a meta unit 100 arranged two-dimensionally. When the meta unit 100 is arranged one-dimensionally, it is possible to steer a reflected beam in a direction perpendicular to the antenna 130. When the meta unit 100 is arranged two-dimensionally, it is possible to steer a reflected beam in a direction not only perpendicular to but horizontal with the antenna 130. In this manner, the optical modulator 10 may steer a beam two-dimensionally.

Figure 8:
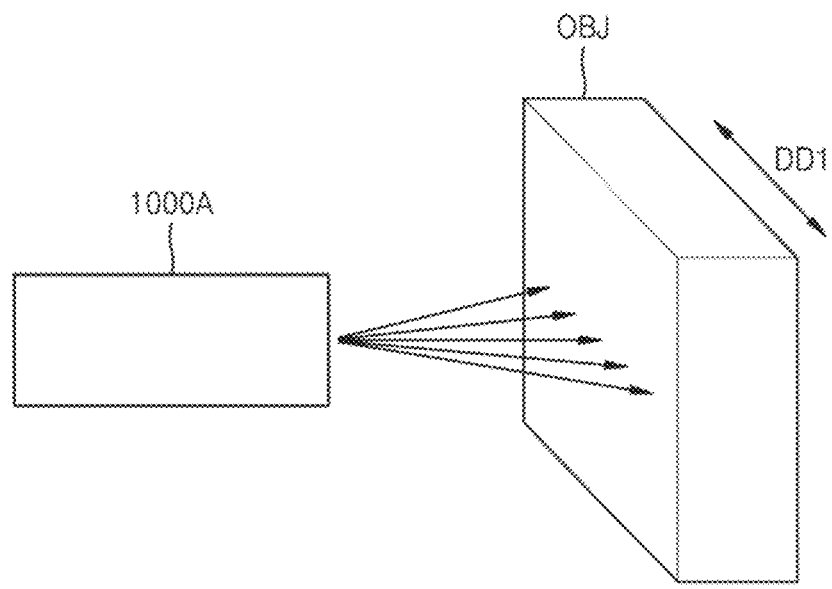
FIG. 8 is a conceptual diagram illustrating a beam steering device including an optical modulator according to an example embodiment.

FIG. 8 is a conceptual diagram for explaining a beam steering device 1000A including an optical modulator 10 according to an example embodiment.

With reference to FIG. 8, a beam may be steered in a one-dimensional direction by using a beam steering device 1000A. For example, the beam may be steered in a first direction DD1 toward a predetermined object OBJ. The beam steering device 1000A may include a one-dimensional array of a plurality of optical modulators 10 according to an example embodiment.

Figure 9:
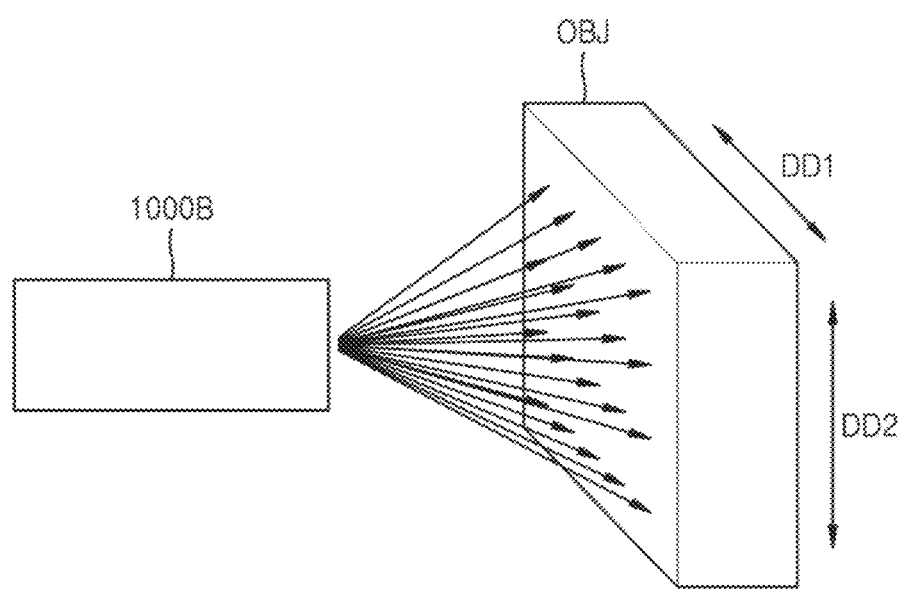
FIG. 9 is a conceptual diagram illustrating a beam steering device including an optical modulator according to another example embodiment.

FIG. 9 is a conceptual diagram for explaining a beam steering device 1000B including an optical modulator 10 according to another example embodiment.

With reference to FIG. 9, a beam may be steered in a two-dimensional direction by using a beam steering device 1000B. For example, the beam may be steered in the first direction DD1 toward a predetermined object OBJ and in a second direction DD2 perpendicular thereto. The beam steering device 1000B may include a two-dimensional array of a plurality of optical modulators 10 according to an example embodiment. The beam steering devices 1000A and 1000B described with reference to FIGS. 8 and 9 may be a non-mechanical beam scanning apparatus.

Figure 10:
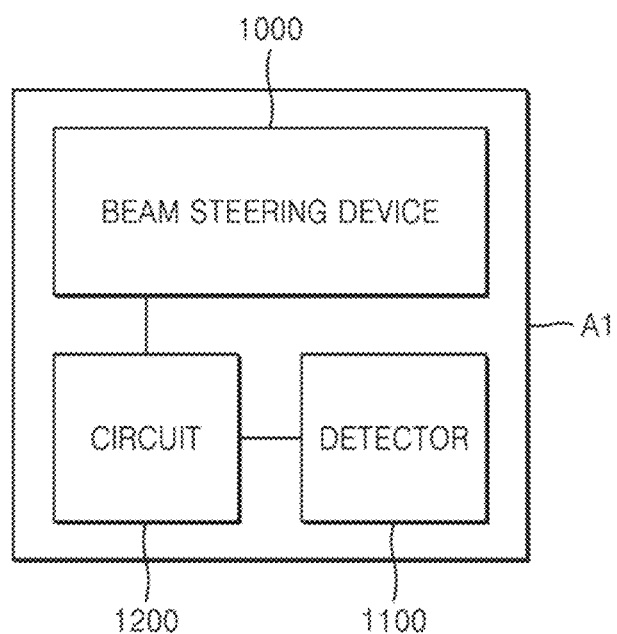
FIG. 10 is a block diagram illustrating an overall system of an electronic apparatus including a beam steering device with an optical modulator according to an example embodiment.

FIG. 10 is a block diagram illustrating an overall system of an electronic apparatus A1 including a beam steering device with an optical modulator 10 according to an example embodiment.

With reference to FIG. 10, the electronic apparatus A1 may include a beam steering device 1000. The beam steering device 1000 may include an optical modulator 10 described with reference to FIGS. 1A, 1B, 3, 6, 7, etc. The electronic apparatus A1 may include a light source in the beam steering device 1000, or include a light source provided separately from the beam steering device 1000. The electronic apparatus A1 may include a detector 1100 configured to detect light reflected by an object of light steered by the beam steering device 1000. The detector 1100 may include a plurality of light detecting elements, and may further include other optical components. The electronic apparatus A1 may further include a circuit 1200 connected to at least one of the beam steering device 1000 and the detector 1100. The circuit 1200 may include a calculator configured to obtain and calculate data, and further include a driver, a processor, etc. In addition, the circuit 1200 may further include a power supply, a memory, etc.

FIG. 10 illustrates that an electronic apparatus A1 includes a beam steering device 1000 and a detector 1100 included in a single device. However, the beam steering device 1000 and the detector 1100 may be provided in each separate device instead of being included in a single device. Further, the circuit 1200 may not be connected in a wired manner to the beam steering device 1000 or the detector 1100, and may be connected by a wireless communication. The configuration of FIG. 10 may be changed in various other ways.

An optical modulator or a beam steering device including the optical modulator according to example embodiments described above may be applied to various electronic apparatuses. For example, the beam steering device may be applied to a light detection and ranging (LiDAR) device. The LiDAR device may be a device adopting a phase-shift method or a time-of-flight (TOF) method. Further, an optical modulator or a beam steering device including the optical modulator according to an example embodiment may be embedded in electronic apparatuses, such as a smartphone, a wearable device (augmented reality, and virtual reality implementation glasses, etc.), Internet of Things (IoT) devices, home appliances, tablet personal computers (PCs), a personal digital assistant (PDA), a portable multimedia player (PMP), a navigation, a drone, a robot, an unmanned vehicle, an autonomous vehicle, an advanced drivers assistance system (ADAS), etc.

Figure 11:
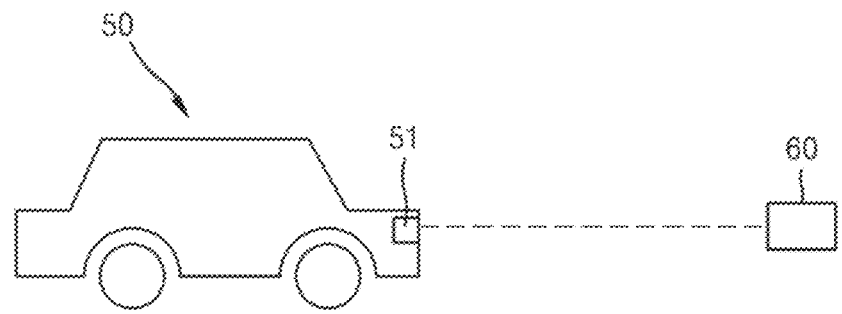
FIG. 11 is a conceptual diagram illustrating a side view in which a light detection and ranging (LiDAR) device including an optical modulator according to an example embodiment is applied to a vehicle.
Figure 12:
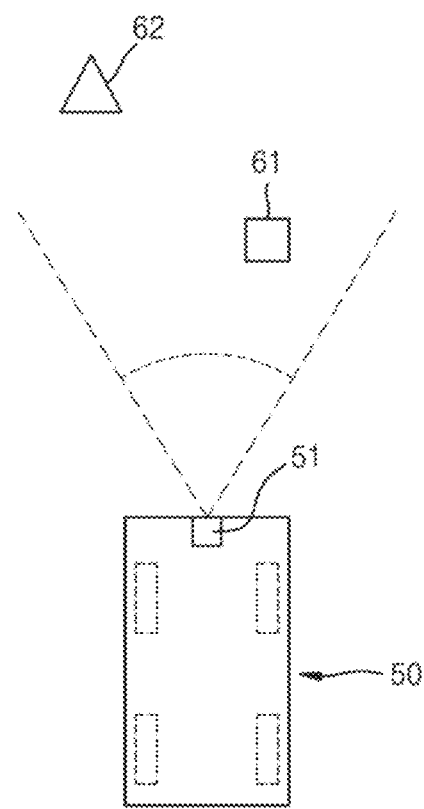
FIG. 12 is a conceptual diagram illustrating a top view in which a light detection and ranging (LiDAR) device including an optical modulator according to an example embodiment is applied to a vehicle.

FIGS. 11 and 12 are conceptual diagrams illustrating application of a LiDAR device including an optical modulator according to an example embodiment to a vehicle. FIG. 11 is a diagram illustrating a side view of the application, and FIG. 12 is a diagram illustrating a top view of the application.

With reference to FIG. 11, a LiDAR device 51 may be applied to a vehicle 50, and information on an object 60 may be obtained by using the device. The vehicle 50 may be an automobile having an autonomous driving function. By using the LiDAR device 51, an object or person located in a driving direction of a vehicle 50, for example, an object 60, may be detected. In addition, by using information on a time difference between transmission signals and detection signals, a distance to the object 60 may be measured. Moreover, as illustrated in FIG. 12, information on a nearby object 61 and a distant object 62 within a scanning range may be obtained.

An optical modulator according to various example embodiments may be applied to various electronic apparatuses besides a LiDAR device. For example, by using the optical modulator according to various example embodiments, three-dimensional information on a space or an object may be obtained by means of scanning, and thus, it may be applied to a three-dimensional image acquisition device or a three-dimensional camera, etc. Further, the optical modulator may be applied to a holographic display device and a structured light generation device. Also, the optical modulator may be applied to various optical components/apparatuses such as various beam scanning devices, hologram generating devices, optical coupling devices, variable focus lenses, depth sensors, etc. Moreover, the optical modulator may be applied to various fields where a "metasurface" or "metastructure" is used. Apart from the above, an optical modulator and an electronic apparatus including the same according to an example embodiment may be applied to diverse fields of optics and electronic apparatuses for various purposes.

Figure 13:
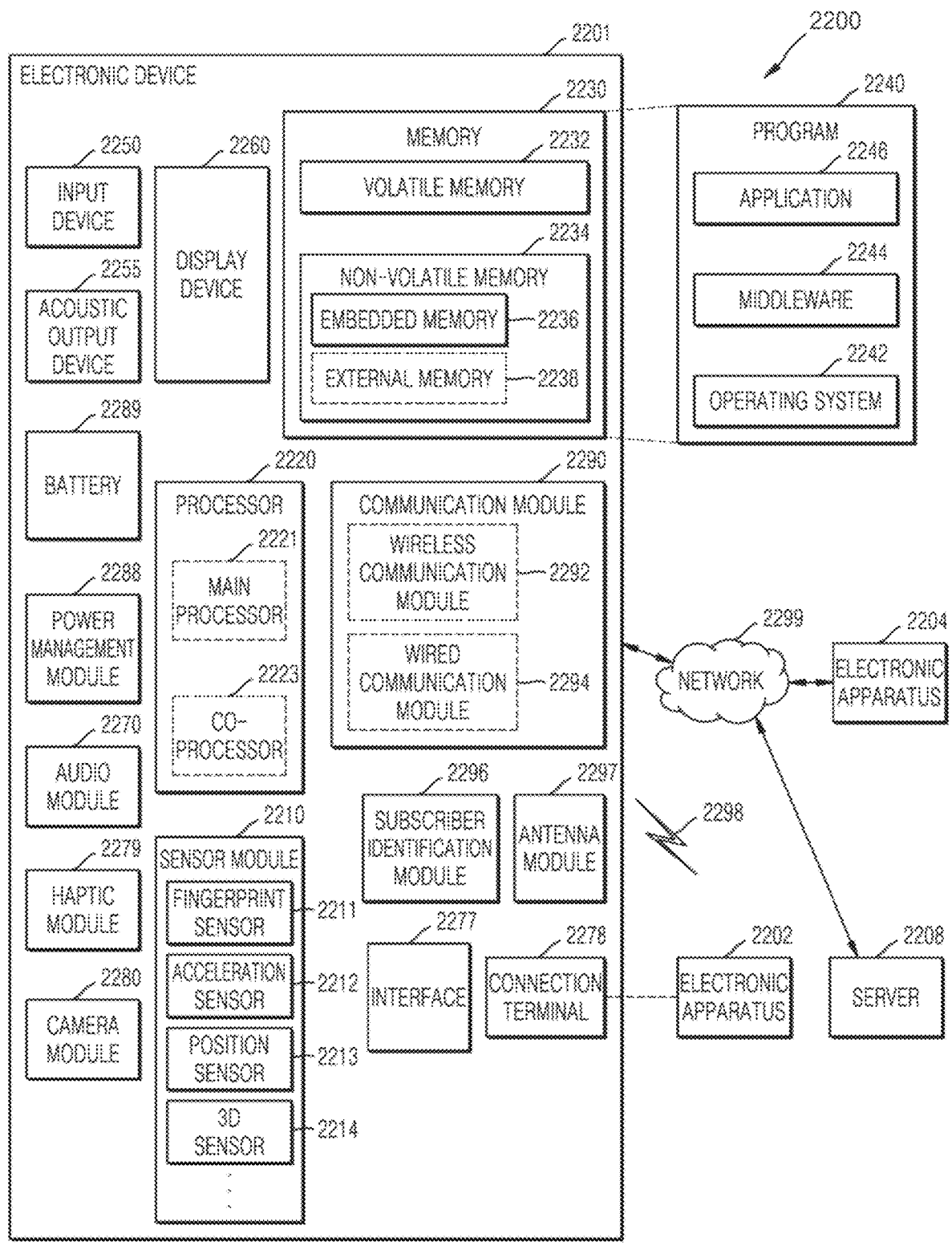
FIG. 13 is a block diagram illustrating a schematic configuration of an electronic apparatus according to an example embodiment.

FIG. 13 is a block diagram illustrating a schematic configuration of an electronic apparatus according to an example embodiment.

With reference to FIG. 13, in a network environment 2200, an electronic apparatus 2201 may communicate with other electronic apparatus 2202 through a first network 2298 (a short-distance wireless communication network, etc.), or with another electronic apparatus 2204 and/or server 2208 through a second network 2299 (a long-distance wireless communication network, etc.) The electronic apparatus 2201 may communicate with the electronic apparatus 2204 through the server 2208. The electronic apparatus 2201 may include a processor 2220, a memory 2230, an input device 2250, an acoustic output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic apparatus 2201, some of the aforementioned components (e.g., a display device 2260, etc.) may be omitted, or other components may be added. Some of the foregoing components may be implemented as a single integrated circuit. For example, a fingerprint sensor 2211 of the sensor module 2210, or an iris sensor, an illumination sensor, etc. may be implemented by being embedded in the display device 2260 (e.g. a display, etc.)

The processor 2220 may control one or more other components (e.g., hardware, software components, etc.) of the electronic apparatus 2201 connected to the processor 2220 by executing a software (e.g., a program 2240, etc.), and execute various data processing or operations. As a part of data processing or operations, the processor 2220 may load commands and/or data received from other components (e.g., the sensor module 2210, communication module 2290, etc.) to a volatile memory 2232, process commands and/or data stored in the volatile memory 2232, and store the resulting data in a non-volatile memory 2234. The processor 2220 may include a main processor 2221 (e.g., a central processing unit, application processor, etc.), and a co-processor 2223 which may operate independently or together with the main processor (e.g., a graphics processing unit, image signal processor, sensor hub processor, communication processor, etc.) The co-processor 2223 may use less electricity than the main processor 2221, and perform a specialized function.

The co-processor 2223 may control functions and/or states related to some components of the electronic apparatus 2201 (e.g., a display device 2260, sensor module 2210, communication module 2290, etc.) in place of the main processor 2221 when the main processor 2221 is in an inactive state (e.g., in a sleep), and together with the main processor 2221 when the main processor 2221 is in an active state (e.g., when an application is being executed). The co-processor 2223 (e.g., an image signal processor, communication processor, etc.) may be implemented as a part of other functionally related components (e.g., a camera module 2280, communication module 2290, etc.)

The memory 2230 may store various data required by components of the electronic apparatus 2201 (e.g., a processor 2220, sensor module 2276, etc.) The data may include, for example, a software (e.g., a program 2240, etc.) and input data and/or output data regarding relevant commands. The memory 2230 may include a volatile memory 2232 and/or non-volatile memory 2234.

The program 2240 may be stored in the memory 2230 as a software, and may include an operating system 2242, a middleware 2244, and/or an application 2246.

The input device 2250 may receive commands and/or data to be used to components (e.g., a processor 2220, etc.) of the electronic apparatus 2201 from the outside (e.g., a user, etc.) of the electronic apparatus 2201. The input device 2250 may include a microphone, a mouse, a keyboard, and/or a digital pen (e.g., a stylus pen, etc.)

The acoustic output device 2255 may output acoustic signals to the outside of the electronic apparatus 2201. The acoustic output device 2255 may include a speaker and/or a receiver. The speaker may be used for general purposes such as multimedia play or playback, and the receiver may be used to receive incoming calls. The receiver may be integrated as a part of the speaker or implemented independently as a separate device.

The display device 2260 may visually provide information to the outside of the electronic apparatus 2201. The display device 2260 may include a display, a hologram device, a projector, or a control circuit configured to control the said devices. The display device 2260 may include a touch circuitry configured to sense a touch, and/or a sensor circuit (e.g., a pressure sensor, etc.) configured to measure an intensity of force generated by a touch.

The audio module 2270 may convert sounds into electric signals, or reversely, electric signals into sounds. The audio module 2270 may obtain a sound through the input device 2250, or output a sound via the acoustic output device 2255, and/or speakers and/or headphones of other electronic apparatuses (e.g., an electronic apparatus 2102, etc.) directly or wirelessly connected with the electronic apparatus 2201.

The sensor module 2210 may sense an operational state (e.g., power, temperature, etc.) of the electronic apparatus 2201 or external environmental state (e.g., user state, etc.), and generate electric signals and/or data values corresponding to a sensed state. The sensor module 2210 may include a fingerprint sensor 2211, an acceleration sensor 2212, a position sensor 2213, a 3D sensor 2214, etc., and may further include an iris sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, and/or an illumination sensor.

The 3D sensor 2214 configured to irradiate a predetermined light to an object and analyze light reflected from the object to sense its shape, and movement, etc. may include any one of optical modulators according to the aforementioned embodiments.

The interface 2277 may support one or more designated protocols which may be used to directly or wirelessly connect the electronic apparatus 2201 with other electronic apparatuses (e.g., the electronic apparatus 2102, etc.) The interface 2277 may include a high definition multimedia interface (HDMI), a universal serial bus (USB) interface, an SD card interface, and/or an audio interface.

A connection terminal 2278 may include a connector that may physically connect the electronic apparatus 2201 with other electronic apparatuses (e.g., the electronic apparatus 2102, etc.) The connection terminal 2278 may include a HDMI connector, a USB connector, an SD card connector, and/or an audio connector (e.g., a headphone connector, etc.)

The haptic module 2279 may convert electric signals into mechanical stimuli (e.g., vibration, motion, etc.) or electric stimuli that a user can perceive through the sense of touch or sense of movement. The haptic module 2279 may include a motor, a piezoelectric element, and/or an electric stimulator.

The camera module 2280 may take static images and moving pictures. The camera module 2280 may include a lens assembly including one or more lenses, image sensors, image signal processors, and/or flashes. The lens assembly included in the camera module 2280 may collect light emitted from an object, which is subject to an image photographing, and may include any one of optical modulators according to the aforementioned embodiments.

The power management module 2288 may manage power supplied to the electronic apparatus 2201. The power management module 2288 may be implemented as a part of a power management integrated circuit (PMIC).

The battery 2289 may supply power to components of the electronic apparatus 2201. The battery 2289 may include a first battery, which is unrechargeable, and a second battery which is rechargeable and/or a fuel cell.

The communication module 2290 may support establishment of a direct (wired) communication channel and/or wireless communication channel between the electronic apparatus 2201 and other electronic apparatuses (e.g., the electronic apparatus 2102, electronic apparatus 2104, server 2108, etc.), and performance of communication through established communication channels. The communication module 2290 may be operated independently from the processor 2220 (e.g., an application processor, etc.) and may include one or more communication processors that support direct communication and/or wireless communication. The communication module 2290 may include a wireless communication module 2292 (e.g., a cellular communication module, short-distance wireless communication module, global navigation satellite system (GNSS) communication module, etc.) and/or a wired communication module 2294 (e.g., a local area network (LAN) communication module, power line communication module, etc.) Among the aforementioned communication modules, a corresponding communication module may communicate with other electronic apparatuses through a first network 2298 (e.g., short-distance communication networks, including a bluetooth, WiFi Direct, or infrared data association (IrDA)) and a second network 2299 (e.g., long-distance communication networks including a cellar network, internet, or computer networks, such as LAN, wide area network (WAN), etc.) Such various types of communication modules may be integrated into one component (e.g., a single chip, etc.), or may be implemented as a plurality of separate components (e.g., multiple chips). The wireless communication module 2292 may verify and authenticate the electronic apparatus 2201 in communication networks, such as the first network 2298 and/or the second network 2299 by using subscriber information (e.g., international mobile station identity (IMSI), etc.) stored in the subscriber identification module 2296.

The antenna module 2297 may transmit signals and/or power to the outside (e.g., other electronic apparatuses, etc.) or receive them from the outside. The antenna may include a radiator consisting of conductive patterns formed on a substrate (e.g., a printed circuit board (PCB), etc.) The antenna module 2297 may include one or more antennas. When a plurality of antennas are included, it may be selected from the plurality of antennas the antennas suitable for communication methods used in communication networks, such as the first network 2298 and/or the second network 2299. Signals and/or power may be transmitted or received between the communication module 2290 and other electronic apparatuses via the selected antennas. Other components (e.g., a radio frequency integrated circuit (RFIC), etc.) other than the antenna may be included as a part in the antenna module 2297.

Some of the components may be connected and exchange signals (e.g., commands, data, etc.) with each other through communication methods among peripheral devices (e.g., a bus, general purpose input and output (GPIO), serial peripheral interphase (SPI), mobile industry processor interface (MIPI), etc.)

Commands or data may be transmitted or received between the electronic apparatus 2201 and external electronic apparatus 2204 via the server 2108 connected to the second network 2299. Other electronic apparatuses 2202 and 2204 may be the same or different type of apparatus with the electronic apparatus 2201. All or parts of operations executed in the electronic apparatus 2201 may be executed in one or more other electronic apparatuses 2202, 2204 and 2208. For example, when the electronic apparatus 2201 needs to perform a certain function or service, it may request execution of the function or service in whole or in part from one or more other electronic apparatuses, instead of executing the function or service for itself. One or more other electronic apparatuses which have received the aforementioned request may execute an additional function or service associated with the request, and may transmit the results of the execution to the electronic apparatus 2201. To this end, cloud computing, distributed computing, and/or client-server computing technologies may be used.

Figure 14:
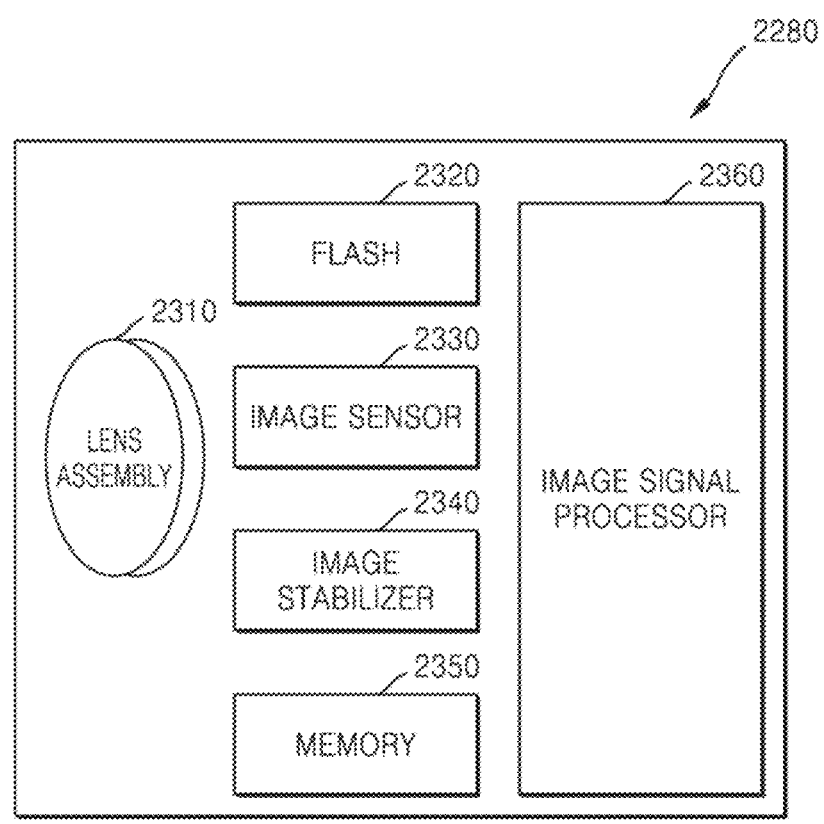
FIG. 14 is an exemplary block diagram illustrating a schematic configuration of a camera module provided in the electronic apparatus of FIG. 13.

FIG. 14 is an exemplary block diagram illustrating a schematic configuration of a camera module provided in an electronic apparatus of FIG. 13.

With reference to FIG. 14, the camera module 2280 may include a lens assembly 2310, a flash 2320, an image sensor 2330, an image stabilizer 2340, a memory 2350 (e.g., a buffer memory, etc.), and/or an image signal processor 2360. The lens assembly 2310 can collect light emitted from an object, which is subject to an image photographing, and may include any one of the aforementioned optical modulators. The lens assembly 2310 may include one or more refractive lenses and optical modulators. The optical modulator provided therein may have a predetermined phase profile and may be designed as a lens having a compensation structure to reduce phase discontinuity. The lens assembly 2310 having such optical modulator may implement a desired optical performance and have a short optical total length.

In addition to this, the camera module 2280 may further include an actuator. The actuator may, for example, operate locations of lens elements constituting the lens assembly 2310 for zooming and/or autofocus (AF), and adjust a separation distance between the lens elements.

The camera module 2280 may include a plurality of lens assemblies 2310, and in such case, the camera module 2280 may be a dual camera, a 360-degree camera, or a spherical camera. Some of the plurality of lens assemblies 2310 may have same lens attributes (e.g., an angle of view, a focal distance, an automatic focus, a F number, an optical zoom, etc.), or different lens attributes. The lens assembly 2310 may include a wide angle lens or telephoto lens.

The flash 2320 may emit light which is used to intensify light emitted or reflected from an object. The flash 2320 may include one or more light emitting diodes (e.g., a red-green-blue (RGB) LED, white LED, infrared LED, ultraviolet LED, etc.), and/or xenon lamp. The image sensor 2330 may obtain an image corresponding to an object by converting light, which has been emitted or reflected from the object and then transmitted via the lens assembly 2310, into electric signals. The image sensor 2330 may include one or more sensors selected from a RGB sensor, a black and white (BW) sensor, an infrared light (IR) sensor, or an ultraviolet light (UV) sensor, which all have different attributes. Each sensor included in the image sensor 2330 may be implemented as a charged coupled device (CCD) sensor and/or a complementary metal oxide semiconductor (CMOS) sensor.

The image stabilizer 2340 may react to movements of the camera module 2280 or the electronic apparatus 2301 including the same to move one or more lenses or image sensors 2330 included in the lens assembly 2310 in a certain direction, or control operation characteristics (e.g., adjustment of a read-out timing, etc.) of the image sensor 2330 to compensate for negative effects caused by the movements.

The image stabilizer 2340 may sense movements of the camera module 2280 or the electronic apparatus 2301 by using a gyro sensor (not explicitly shown in the drawings) or an acceleration sensor (not explicitly shown in the drawings) arranged inside or outside the camera module 2280. The image stabilizer 2340 may be implemented in an optical manner.

the memory 2350 may store the entire or parts of data regarding an image obtained through the image sensor 2330 for next image processing operation. For example, when a plurality of images are obtained at a high speed, the obtained original data (e.g., Bayer-patterned data, high resolution data, etc.) may be stored in the memory 2350, and only low resolution images may be displayed. Then, the memory may be used for transmission of the original data of selected images (e.g., images selected by a user, etc.) to the image signal processor 2360. The memory 2350 may be integrated into the memory 2230 of the electronic apparatus 2201, or configured as a separate memory which operates independently.

The image signal processor 2360 may perform one or more image processing operations regarding image obtained via the image sensor 2330 or image data stored in the memory 2350. One or more image processing operations may include a depth map generation, 3D modeling, panorama generation, feature point extraction, image synthesis, and/or image compensation (e.g., noise reduction, resolution adjustment, brightness adjustment, blurring, blurring, sharpening, softening, etc.) The image signal processor 2360 may perform a control (e.g., an exposure time control, or read-out timing control, etc.) of components (e.g., an image sensor 2330, etc.) included in the camera module 2280. The image processed by the image signal processor 2360 may be stored again in the memory 2350 for additional processing or provided to external components (e.g., the memory 2230, display device 2260, electronic apparatus 2202, electronic apparatus 2204, server 2208, etc.) of the camera module 2280. The image signal processor 2360 may be integrated into the processor 2220, or be configured as a separate processor which operates independently from the processor 2220. When the image signal processor 2360 is configured as a separate processor distinct from the processor 2220, images processed by the image signal processor 2360 may be displayed via the display device 2260 after an additional image processing by the image processor 2220.

The electronic apparatus 2201 may include a plurality of camera modules 2280 each having different attributes or functions. In this case, one of the plurality of camera modules 2280 may be a wide angle camera, and another may be a telephoto camera. Similarly, one of the plurality of camera modules 2280 may be a front camera and another may be a rear camera.

Figure 15:
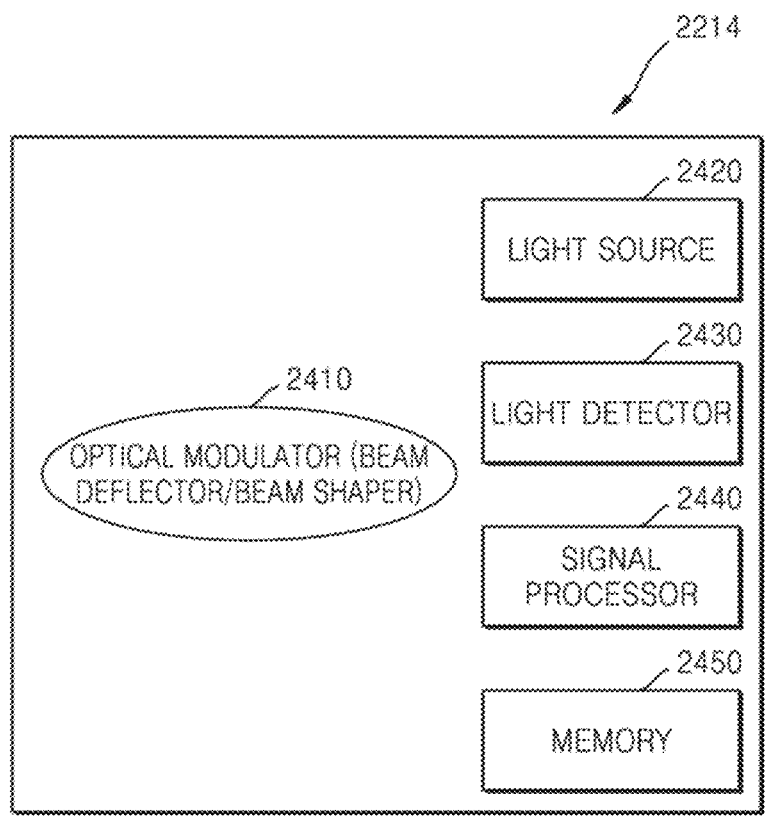
FIG. 15 is a block diagram illustrating a schematic configuration of a 3D sensor provided in the electronic apparatus of FIG. 13.

FIG. 15 is a block diagram illustrating a schematic configuration of a 3D sensor provided in the electronic apparatus of FIG. 13.

The 3D sensor 2214 may sense shapes, movements, etc. of an object by irradiating a predetermined light to the object and then receiving and analyzing light reflected from the object. The 3D sensor 2214 may include a light source 2420, an optical modulator 2410, an optical detector 2430, a signal processor 2440 and a memory 2450. As the optical modulator 2410, any one of optical modulators according to the aforementioned embodiments may be adopted, and a target phase delay profile may be set allowing the optical modulator to function as a beam deflector or a beam shaper.

The light source 2420 may radiate light to be used for a shape or location analysis of an object. The light source 2420 may include a light source which generates and irradiates light of a predetermined wavelength. The light source 2420 may include a light source which generates and irradiates light having a wavelength band suitable for a shape or location analysis of an object, for example, a laser diode (LD), light emitting diode (LED), super luminescent diode (SLD), etc. which generate and irradiate light having an infrared band wavelength. The light source 2420 may be a tunable laser diode. The light source 2420 may generate and irradiate lights having each different wavelength bands. The light source 2420 may generate and irradiate pulse light or continuous light.

The optical modulator 2410 may modulate light radiated from the light source 2420 and transmit the modulated light to an object. When the optical modulator 2410 is a beam deflector, the optical modulator 2410 may deflect incident light in a predetermined direction toward an object. When the optical modulator 2410 is a beam shaper, the optical modulator 2410 may modulate incident light to have a distribution with a predetermined pattern. The optical modulator 2410 may form structured light suitable for a three-dimensional shape analysis.

As described above, the optical modulator 2410 may set a phase delay dispersion ($\partial\varphi/\partial\lambda$) to 0, a positive number, or a negative number, and implement a continuous phase delay profile. Accordingly, it is possible to perform achromatic optical modulation. By increasing a deviation according to a wavelength, a deflection direction may vary for each wavelength, or different beam patterns may be formed for each wavelength for irradiation to an object.

The optical detector 2430 may receive reflected light of light irradiated to an object via the optical modulator 2410. The optical detector 2430 may include an array of a plurality of sensors configured to sense light, or only a single sensor.

The signal processor 2440 may analyze shapes, etc. of an object by processing signals sensed by the optical detector 2430. The signal processor 2440 may analyze a three-dimensional shape including a depth position of an object.

For a three-dimensional shape analysis, an operation for measuring a time-of-flight of light may be performed. Various operation methods may be used for measuring the time-of-flight of light For example, in the direct time measurement method, pulse light is irradiated to an object, and a travel time for the light to be reflected from the object and return is measured by a timer for calculation of distance. As for the correlation method, a distance is calculated by irradiating pulse light to an object and measuring brightness of light reflected from the object. In the phase delay measurement method, light having a continuous wave, such as sine wave is irradiated to an object, and a phase shift of light reflected from the object is sensed to be converted into a distance.

When structured light is irradiated to an object, a depth position of the object may be calculated from changes in patterns of the structured light reflected from the object, e.g., the comparison result between the patterns of the reflected structured light and incident structured light. The depth information of the object may be extracted by tracking a pattern change by coordinates of the structured light reflected from the object, and from this, three-dimensional information relating to shapes, movements, etc. of the object may be extracted.

The memory 2450 may store programs and other data necessary for operations of the signal processor 2440.

The operation results of the signal processor 2440, e.g., information on shapes, locations, etc. of an object may be transmitted to another unit arranged in the electronic apparatus 2200 or another electronic apparatus. For example, applications 2246 stored in the memory 2230 may use such information. Other electronic apparatuses to which the results are transmitted may be a display device or a printer which outputs the results. In addition to the above, the aforementioned electronic apparatuses may further include, but not limited to, an autonomous device, such as an unmanned vehicle, autonomous vehicle, robot, drone, etc., a smartphone, a smart watch, a mobile phone, a personal digital assistant (PDA), a laptop, a PC, various wearable devices, other mobile or non-mobile computing devices and IoT devices.

Figure 16:
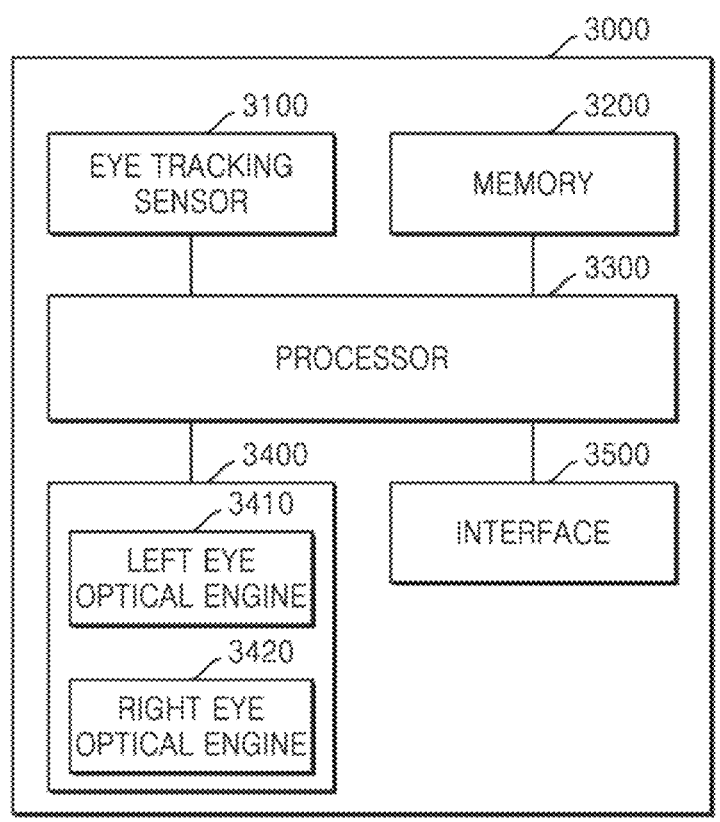
FIG. 16 is a block diagram illustrating a schematic configuration of an electronic apparatus according to another example embodiment.

FIG. 16 is a block diagram illustrating a schematic configuration of an electronic apparatus according to another example embodiment.

The electronic apparatus 3000 of FIG. 16 may be a glasses-type augmented reality (AR) device. The electronic apparatus 3000 may include a display engine 3400, a processor 3300, an eye tracking sensor 3100, an interface 3500, and a memory 3220.

The processor 3300 may drive an operating system or application to control overall operations of the augmented reality device including the display engine 3400, and may process various data including image data and perform operations. For example, the processor 3300 may process image data including a left eye virtual image and right eye virtual image which are rendered to have a binocular parallax.

The interface 3500, which inputs or outputs external data or operation commands, may include a user interface such as, for example, a user-operable touchpad, a controller, an operation button, etc. The interface 3500 may include a wired communication module such as a USB module, or a wireless communication module such as a bluetooth, and through these, the interface may receive user operation information or virtual image data transmitted from an interface included in an external device.

The memory 3200 may include an embedded memory, such as a volatile memory or a non-volatile memory. The memory 3200 may store various data, programs, or applications, which operate and control an augmented reality device by means of control by the processor 3300, input/output signals, or virtual image data.

The display engine 3400 is configured to receive image data generated by the processor 3300 and to generate light of virtual images, and may include a left eye optical engine 3410 and a right eye optical engine 3420. Each of the left eye optical engine 3410 and the right eye optical engine 3420 may include a light source which outputs light and a display panel which forms a virtual image by using light output from the light source, and have the same function as a small projector. The light source may be implemented, for example, by a LED, and the display panel, for example, by a Liquid Crystal On Silicon (LCoS).

The eye tracking sensor 3100 may be mounted at a position where pupils of a user wearing an augmented reality device are trackable, and transmit signals corresponding to user's gaze information to the processor 3300. Such eye tracking sensor 3100 may detect gaze information including a user's gaze direction where user's eyes stare, user's pupil position, coordinates of pupil centerpoint, etc. The processor 3300 may determine a type of eye movements based on the user's gaze information detected by the eye tracking sensor 3100. For example, the processor 3300 may determine various types of eye movements based on the gaze information obtained from the eye tracking sensor, including a fixation (e.g., staring at a certain point), pursuit e.g., following a moving object), saccade (e.g., moving fast from one staring point to another staring point), etc.

Figure 17:
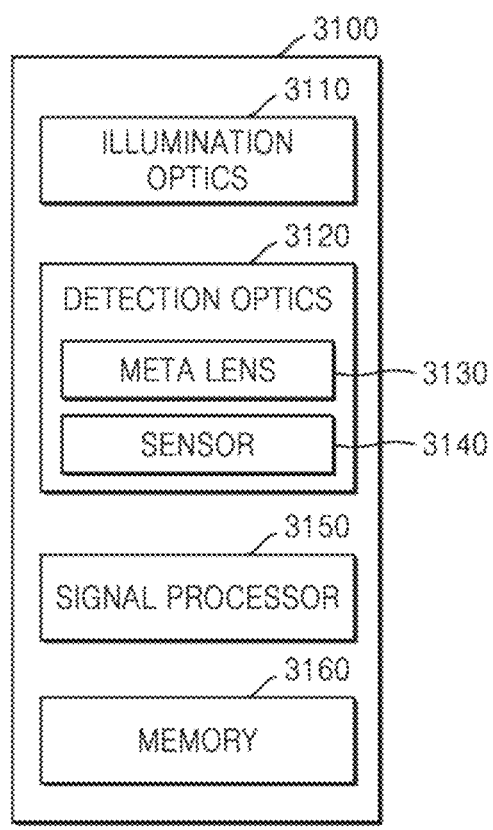
FIG. 17 is a block diagram illustrating a schematic configuration of an eye tracking sensor provided in the electronic apparatus of FIG. 16.

FIG. 17 is a block diagram illustrating a schematic configuration of an eye tracking sensor provided in the electronic apparatus of FIG. 16.

The eye tracking sensor 3100 may include an illumination optics 3110, a detection optics 3120, a signal processor 3150, and a memory 3160. The illumination optics 3110 may include a light source irradiating light, for example, infrared light to a location of an object (e.g., user's eye). The detection optics 3120 configured to detect reflected light may include a meta lens 3130 and a sensor 3140. The signal processor 3150 may calculate user's pupil position, etc., from results of sensing by the detection optics 3120.

As the meta lens 3130, any one or combinations or modifications of optical modulators according to the aforementioned embodiments may be used. The meta lens 3130 may concentrate light from an object in the sensor 3140. An incident angle of light which is incident on the sensor 3140 in the eye tracking sensor 3100 located very close to user's eyes may be greater than or equal to 30° or larger. The meta lens 3130 may have a structure provided with a compensation region, and an efficiency decrease may be reduced even regarding light having a large incident angle. Accordingly, an accuracy in eye tracking may increase.

As glasses-type devices may also be used not only as an augmented reality (AR) device but as glasses-type virtual reality (VR) device, user's gaze at VR images provided from the device may also be tracked.

Optical modulators which modulate lights in a non-mechanical manner and operate as light modulation elements having high performance are provided.

The optical modulator may increase a modulation efficiency by allowing a thickness of a layer where a refractive index changes to be tens to hundreds of nanometers.

The optical modulator may increase a phase modulation efficiency through high phase modulation capability and reflectance in an infrared light region.

The antenna of the optical modulator may have a width in accordance with conditions of Fabry-Perot resonance relating to incident light.

The optical modulator may be used as a beam scanning device, and for example, as a LiDAR sensor, a depth sensor, variable focus lenses, a hologram, etc., and further, may be employed in production of a phase modulation array or display element using optical modulators, or adopted in various electronic apparatuses.

It should be understood that embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:
1. An optical modulator comprising:
a substrate; and
a plurality of meta units provided on the substrate and spaced apart from each other,
wherein at least one of the plurality of meta units comprises:
a metal layer provided on the substrate;

a dielectric layer provided an upper surface and side surfaces of the metal layer; and an antenna provided directly on an upper surface of the dielectric layer, the antenna comprising phase change material, and wherein a refractive index of the phase change material changes based on a voltage applied to the metal layer to modulate incident light.

2. The optical modulator of claim 1, wherein the plurality of meta units comprise a first meta unit and a second meta unit provided adjacent to each other, wherein a metal layer and an antenna included in the first meta unit are provided spaced apart from a metal layer and an antenna included in the second meta unit, respectively, and wherein a dielectric layer included in the first meta unit and a dielectric layer included in the second meta unit are connected to each other.

3. The optical modulator of claim 1, wherein a difference between a real part of a refractive index of the phase change material in a crystalline state and a real part of a refractive index of the phase change material in an amorphous state is greater than or equal to 1.

4. The optical modulator of claim 1, wherein an imaginary part of a refractive index of the phase change material in an infrared wavelength region is less than or equal to 3.

5. The optical modulator of claim 1, wherein the phase change material comprises at least one of germanium (Ge), antimony (Sb), and tellurium (Te).

6. The optical modulator of claim 5, wherein the phase change material comprise at least one of Ge2Sb2Te5 and Ge3Sb2Te6.

7. The optical modulator of claim 1, wherein the incident light on the meta units forms surface plasmon resonance (SPR) between the antenna and the metal layer.

8. The optical modulator of claim 7, wherein the antenna has a width corresponding to Fabry-Perot resonance of the incident light.

9. The optical modulator of claim 1, wherein a width of the antenna is less than a wavelength of the incident light.

10. The optical modulator of claim 1, wherein a temperature of the metal layer changes based on the voltage applied to the metal layer, and wherein a temperature of the antenna changes based on the temperature change of the metal layer.

11. The optical modulator of claim 10, wherein the antenna has a thickness such that a difference between a maximum temperature and a minimum temperature in an entire area of the antenna is less than 100° C.

12. The optical modulator of claim 10, wherein a thickness of the antenna ranges from 10 nm to 200 nm.

13. The optical modulator of claim 12, wherein the antenna has the thickness such that a difference between an average temperature of an area of the antenna and an average temperature of an area of the metal layer is less than 100° C.

14. The optical modulator of claim 10, wherein the dielectric layer has a thickness such that a difference between a maximum temperature and a minimum temperature in an entire area of the antenna is less than 100° C.

15. The optical modulator of claim 14, wherein the thickness of the dielectric layer ranges from 3 nm to 80 nm.

16. The optical modulator of claim 10, wherein the voltage is applied to each of the plurality of meta units such that light reflected from the optical modulator forms a wavefront and is steered to a specific point.

17. The optical modulator of claim 10, wherein a steering direction of light reflected from the optical modulator changes based on modulation periods of the plurality of meta units.

18. The optical modulator of claim 1, the plurality of meta units are provided one-dimensionally or two-dimensionally.

19. An electronic apparatus comprising the optical modulator of claim 1.

20. The electronic apparatus of claim 19 comprising at least one of a light detection and ranging (LiDAR) device, a three-dimensional image acquisition device, a holographic display device, a structured light generation device, a portable terminal, and augmented reality or virtual reality glasses.

* * * * *